United States Patent [19]

Jeon

[11] Patent Number: 5,565,655
[45] Date of Patent: Oct. 15, 1996

[54] METHOD OF DETECTING FOOD WEIGHT IN MICROWAVE OVEN BY PROCESSING WEIGHT SENSOR SIGNALS

[75] Inventor: Hyo S. Jeon, Kyungki-do, Rep. of Korea

[73] Assignee: Goldstar Co., Ltd., Seoul, Rep. of Korea

[21] Appl. No.: 152,857

[22] Filed: Nov. 15, 1993

[30] Foreign Application Priority Data

Nov. 19, 1992 [KR] Rep. of Korea ................. 21713/1992
Dec. 29, 1992 [KR] Rep. of Korea ................. 26278/1992
Apr. 24, 1993 [KR] Rep. of Korea ................. 6911/1993

[51] Int. Cl.$^6$ ......................... G01G 19/00; G01C 17/38; H05B 6/50
[52] U.S. Cl. ......................... 177/245; 177/1; 177/210 C; 219/708; 73/1 B
[58] Field of Search ................. 177/144, 210 R, 177/210 C, 245, 1, 25.13, 25.14, 210 FP; 219/518, 705, 707, 708, 710, 719; 73/1 B

[56] References Cited

U.S. PATENT DOCUMENTS

| | | | |
|---|---|---|---|
| 4,051,721 | 10/1977 | Williams | 177/210 C |
| 4,629,019 | 12/1986 | Harrington et al. | 177/210 C |
| 4,683,967 | 8/1987 | Hanatani et al. | 177/144 |
| 4,895,067 | 1/1990 | Ohji et al. | 219/518 X |
| 4,939,333 | 7/1990 | Haruo et al. | 219/518 X |
| 5,422,464 | 6/1995 | Jeon | 219/708 |

FOREIGN PATENT DOCUMENTS 90-2161  1/1990  Rep. of Korea ................. H05B 6/68

*Primary Examiner*—Brian W. Brown
*Assistant Examiner*—Randy W. Gibson
*Attorney, Agent, or Firm*—Fliesler, Dubb, Meyer & Lovejoy LLP

[57] ABSTRACT

An apparatus for and a method of detecting a weight of a food in a microwave oven wherein a weight sensor is used which includes a pair of facing electrodes and an annular spacer interposed between the electrodes and is placed on a turning track of support rollers to be pressed by the support rollers so that the space between the electrodes can be varied when each of the support rollers presses the weight sensor, causing the weight sensor to linearly vary in capacitance and thus in frequency, thereby capable of accurately detecting the food weight by utilizing the frequency variation.

6 Claims, 9 Drawing Sheets

METHOD OF DETECTING FOOD WEIGHT IN MICROWAVE OVEN BY PROCESSING WEIGHT SENSOR SIGNALS

BACKGROUND OF THE INVENTION

1. Field of the Invention

The present invention relates to a microwave oven, and more particularly to an apparatus for and a method of detecting a food weight in a microwave oven.

2. Description of the Prior Art

A conventional technique for detecting the weight of a food to be heated in a microwave oven has been disclosed in Korean Patent Publication No. 90-2322 (Application No. 85-8278).

In accordance with the conventional technique, sensors constituted by piezoelectric elements are placed on a rotation track of a support roller mounted at a peripheral edge of a rotation ring adapted to support and rotate a turntable. As a food is heated, the rotation ring rotates, thereby causing the support roller to press the sensors. Each sensor generates a voltage varied depending on the weight of the food to be heated. Based on the voltage, the food weight can be detected.

In this conventional technique for detecting the food weight by use of the sensors constituted by the piezoelectric elements, however, the voltage generated from each sensor is nonlinearly varied depending on the food weight. This results in a difficulty to accurately detect the food weight. Furthermore, this technique requires the use of a look-up table previously stored with weights respectively corresponding to various voltages generated from sensors. The voltage generated from each sensor may be also varied depending on an installed condition of the sensor and variations in ambient temperature and humidity, thereby resulting in a high error generation rate. In addition, the sensors may be easily damaged due to the food weight applied thereto.

When a drive motor is stopped after completion of the cooking of the food, the rotation of the support roller is stopped. However, if the support roller is stopped on a sensor, the weight of the turntable is applied to the sensor, thereby causing the sensor to be deformed. Such a deformation of the sensor may result in a degradation in accuracy. Moreover, the sensor may be damaged when the stopped state of the support roller is kept for a long time or another load is placed on the turntable.

SUMMARY OF THE INVENTION

Therefore an object of the invention is to provide an apparatus for and a method of detecting a weight of a food in a microwave oven wherein a weight sensor is used which includes a pair of facing electrodes and an annular spacer interposed between the electrodes and is placed on a turning track of support rollers to be pressed by the support rollers so that the space between the electrodes can be varied when each of the support rollers presses the weight sensor, causing the weight sensor to linearly vary in capacitance and thus in frequency, thereby capable of accurately detecting the food weight by utilizing the frequency variation.

Another object of the invention is to provide an apparatus for and a method of detecting a weight of a food in a microwave oven wherein a weight sensor is used, capable of protecting the weight sensor by counting an elapsed time by a counter to predict a time interval between a point of time when one of support rollers associated with the weight sensor passes the weight sensor and a point of time when a next support roller passes the weight sensor, checking the timer stopped when a turntable is stopped after completion of a cooking to detect whether an optional one of support rollers has been slopped at a position over the weight, sensor, and further rotating the turntable when the turntable has been determined to be stopped at the position over the weight sensor.

In accordance with one aspect, the present invention provides an apparatus for detecting a food weight in a microwave oven, comprising: a rotation ring adapted to rotate a turntable disposed in a heating chamber of said microwave oven; a plurality of spaced support rollers mounted at a peripheral portion of said rotation ring; a weight sensor placed on a rotation track of said support rollers and adapted to generate a variation in capacitance upon being pressed by each of the support rollers; drive means adapted to generate a drive signal for driving actuating units of the microwave oven including a drive motor for rotating the rotation ring, a magnetron for generating electronic waves, a heating chamber lamp, a fan motor and a high voltage transformer; sensor signal processing means adapted to generate an oscillation frequency, based on said capacitance variation from said weight sensor; and control means adapted to determine a weight of a food to be heated from said frequency outputted from said sensor signal processing means and apply a control signal for heating said food to said drive means.

In accordance with another aspect, the present invention provides a method of detecting a food weight in a microwave oven, comprising the steps of: (a) operating an average value of variations of minimum frequencies each selected from frequencies generated in accordance with a variation in capacitance of a weight sensor under an idle condition that no food is put in a heating chamber; (b) operating an average value of variations of minimum frequencies each selected from frequencies generated in accordance with a variation in capacitance of said weight sensor under an 1 Kg-loaded condition of said heating chamber; (c) operating a slope from said average values respectively operated at said steps (a) and (b); (d) operating an average value of variations of minimum frequencies each selected from frequencies generated in accordance with a variation in capacitance of said weight sensor under a food-loaded condition that a food to be heated is put in the heating chamber; and (e) detecting a weight of said food from the average value operated at the step (a), the slope operated at the step (c) and the average value operated at the step (d).

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
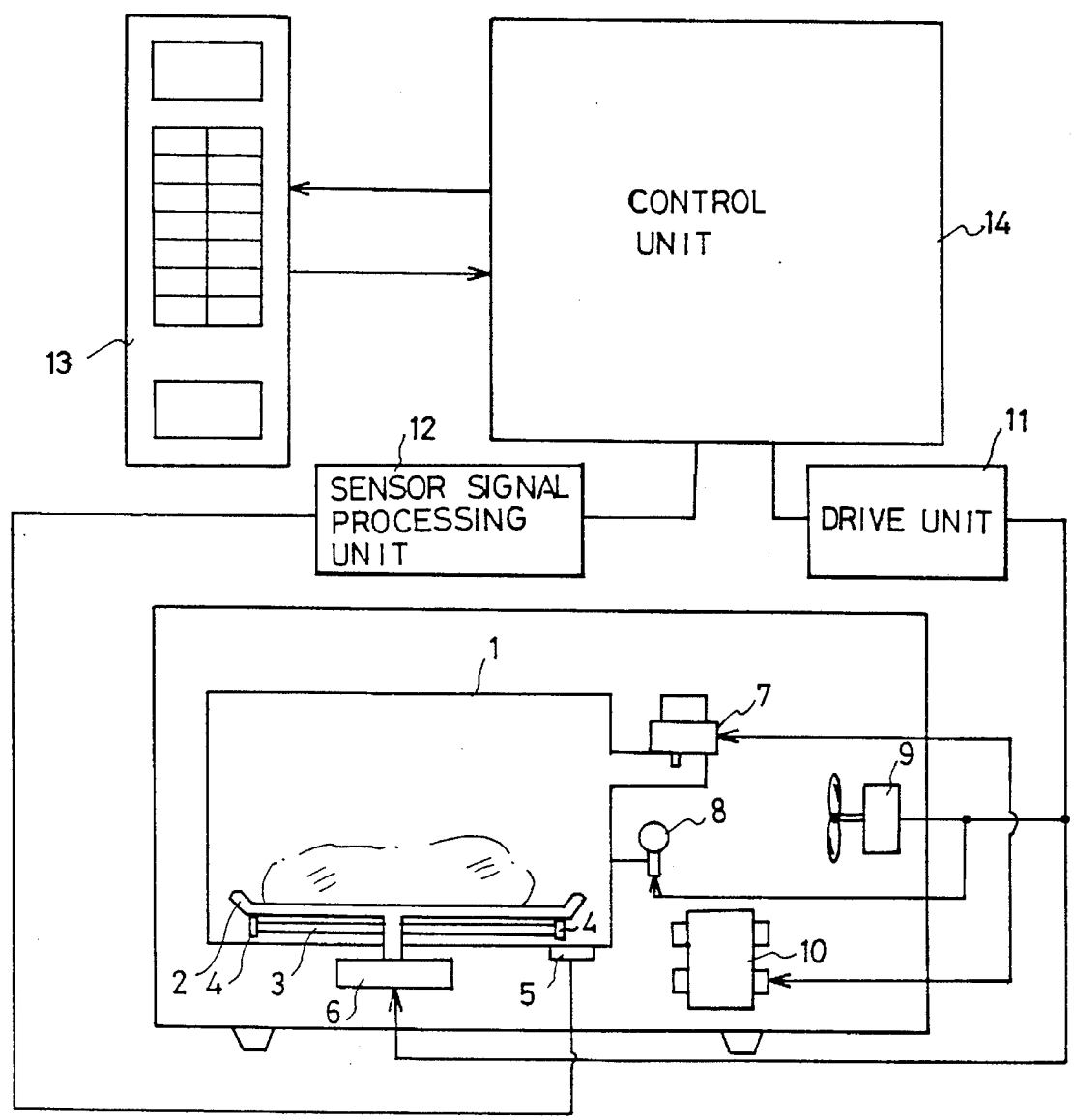
FIG. 1 is a block diagram of an apparatus for detecting a weight of a food in a microwave oven in accordance with the present invention.

Referring to FIGS. 1 to 5 and FIG. 8, there is illustrated an apparatus for detecting a weight of a food in a microwave oven in accordance with the present invention. As shown in the drawings, a rotation ring 3 mounted in a heating chamber 1 and adapted to rotate a turntable 2, a support roller 4 mounted at the peripheral portion of the rotation ring 3 and supported to stably support the turntable 2, a weight sensor 5 placed on a rotation track of the support roller 4 and adapted to be pressed by the support roller 4 and thereby varied in capacitance, a drive motor 6 adapted to rotate the rotation ring 3, and a magnetron 7 adapted to generate electromagnetic waves. A drive unit 11 is also provided which outputs a drive signal for driving a heating chamber lamp 8, a fan motor 9 and a high voltage transformer 10. The food weight detecting apparatus further comprises a sensor signal processing unit 12 adapted to generate an oscillation frequency according to a variable capacitance outputted from the weight sensor 5, and a control unit 14 adapted to detect the weight of a food to be heated, based on the frequency outputted from the sensor signal processing unit 12, output a control signal for heating the food, based on the detected food weight and apply the control signal to the drive unit 11. The weight sensor 5 may be comprised of a variable capacitor. The sensor signal processing unit 12 may comprises an oscillator adapted to vary in frequency, depending on a space defined between a pair of electrodes constituting the weight sensor 5.

Figure 2:
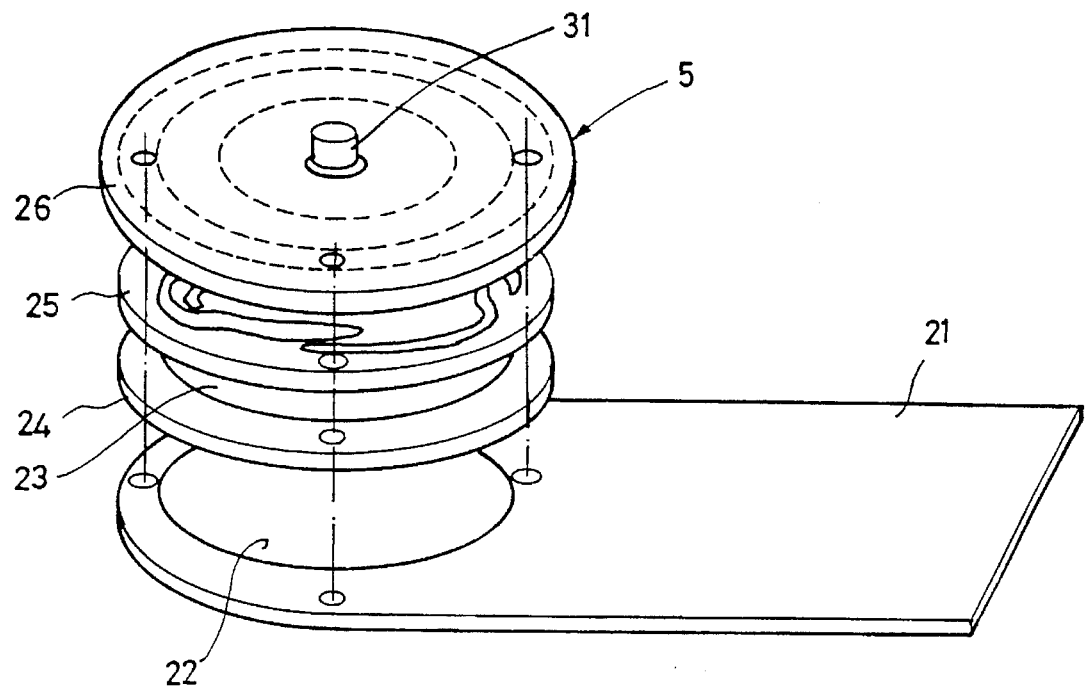
FIGS. 2 and 3 are an exploded perspective view and a sectional view of a weight sensor equipped in the food weight detecting apparatus in accordance with the present invention, respectively.
Figure 3:
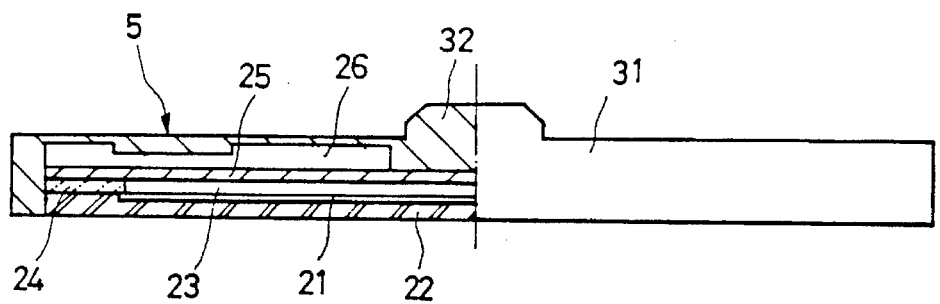

As shown in FIGS. 2 and 3, the weight sensor 5 which is placed on the turning track of the support rollers 4 comprises a base plate 21 and a pair of electrodes. One electrode is constituted by a circular copper foil 22 printed on the base plate 21. The other electrode is constituted by a plate spring 25 disposed over the circular copper foil 22. A spacer 24 having a central opening 23 is interposed between the circular copper foil 22 and the plate spring 25. Over the plate spring 25, a cover 26 is disposed which is made of an elastic material such as a rubber so as to protect the base plate 21, the spacer 24 and the plate spring 25.

An upwardly extending protrusion 31 is centrally formed at the outer surface of the cover 26. A push member 32 is formed at the inner surface of the cover 26 to push the central portion of the plate spring 25.

Figure 4:
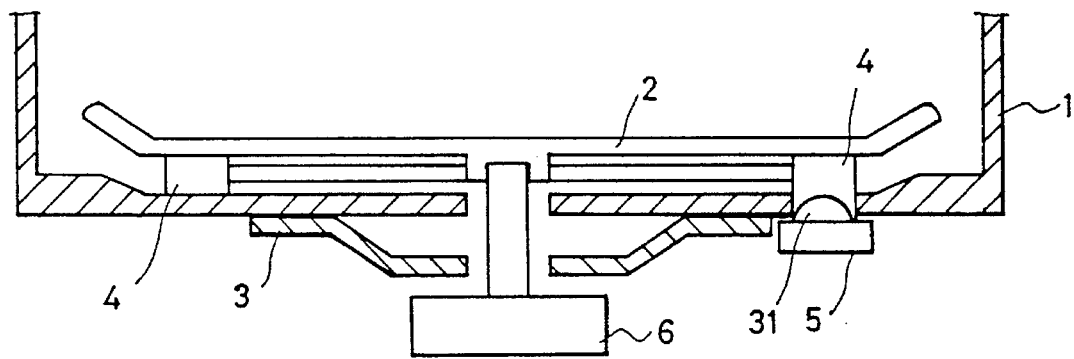
FIGS. 4 and 5 are a sectional view and a plan view illustrating a condition that the weight sensor of the food weight detecting apparatus is installed in the microwave oven in accordance with the present invention, respectively.
Figure 5:
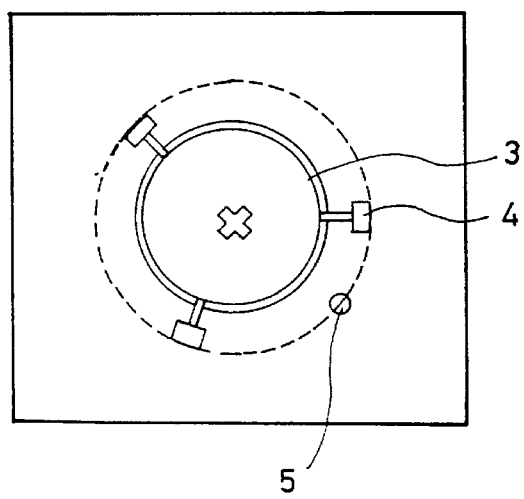

As shown in FIGS. 4 and 5, the weight sensor 5 having the above-mentioned construction is positioned at the turning track of the support rollers 4 on the bottom plate of the heating chamber 1 such that the protrusion 31 is protruded into the heating chamber 1. As a result, the protrusion 31 can be pressed by the support roller 4 which is turning.

Figure 8:
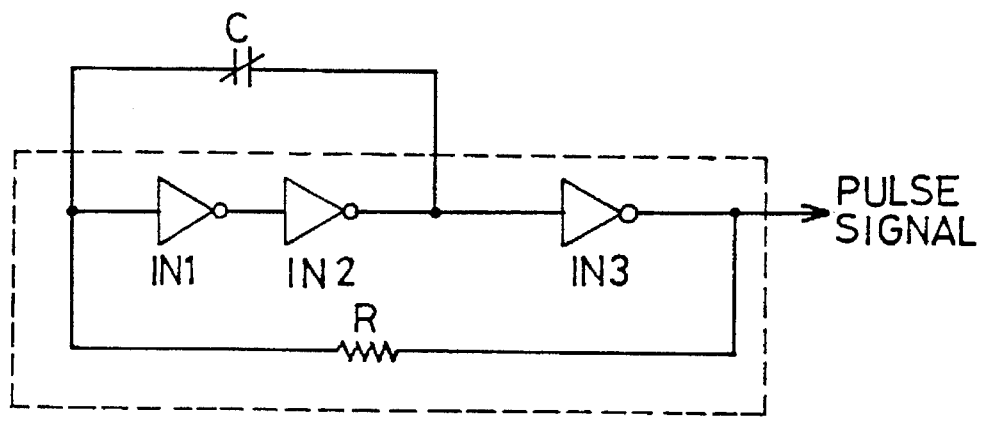
FIG. 8 is a circuit diagram of a sensor signal processing unit equipped in the food weight detecting apparatus in accordance with the present invention.

On the other hand, the sensor signal processing unit 12 comprises inverters IN1 to IN3 and a resistor R functioning together to generate an oscillation frequency according to the capacitance outputted from the weight sensor 5, as shown in FIG. 8.

In FIG. 1, the reference numeral 13 denotes a manipulation unit for selecting a desired operation of the microwave oven by a user's manipulation.

Operation of the food weight detecting apparatus having the above-mentioned arrangement in accordance with the present invention will now be described, in conjunction with FIGS. 1 to 13.

As the user puts a food to be heated in the heating chamber 1 and then manipulates the manipulation unit 13 to heat the food, the control unit 14 outputs a control signal in accordance with a command outputted from the manipulation unit 13. The control signal from the control unit 14 is sent to the drive unit 11 which, in turn, converts it into a drive signal. The drive motor 6 receives the drive signal from the drive unit 11 to rotate. By the drive signal, the magnetron 7, the heating chamber lamp 8, the fan motor 9 and the high voltage transformer 10 are also driven. As a result, the food begins to be heated.

As the drive motor 6 drives, the rotation ring 3 rotates, thereby causing the support rollers 4 to turn along a predetermined turning track. Accordingly, the turntable 2 and the food placed on the turntable 2 rotate together. During the rotation, the support rollers 4 press the protrusion 31 of the weight sensor 5 at predetermined intervals.

When each support roller 4 presses the protrusion 31, the press load is transmitted to the plate spring 25 via the push member 32, thereby causing the plate spring 25 to move downwardly. By the downward movement of the plate spring 25, the space between the plate spring 25 and the copper foil 22 is varied. As a result, the capacitance C is varied.

Now, such a variation in capacitance of the weight sensor will be described in detail. A capacitance C obtained between a pair of facing electrodes can be generally expressed by the following relation equation:

$$C = \epsilon_o * \epsilon_r * S/d$$

wherein, $\epsilon_o$ and $\epsilon_r$ represent dielectric constants, respectively, S represents the facing area between the electrodes, and d represents the space between the electrodes.

In other words, the capacitance C is proportional to the facing area S and inversely proportional to the space d.

Figure 6:
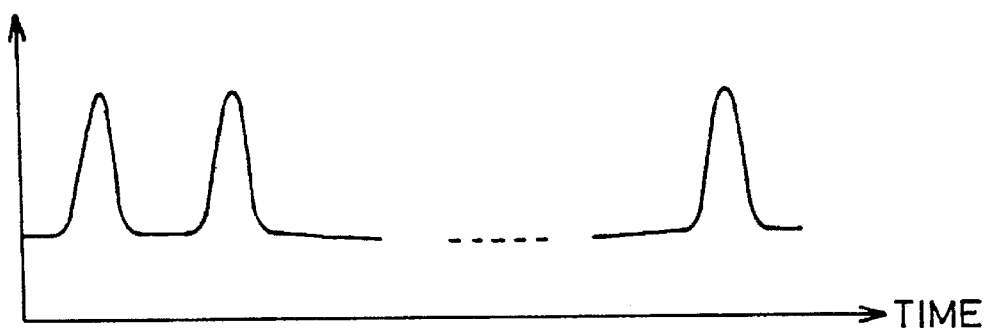
FIG. 6 is a graph illustrating a variation in capacitance of the weight sensor in accordance with the present invention.
Figure 7:
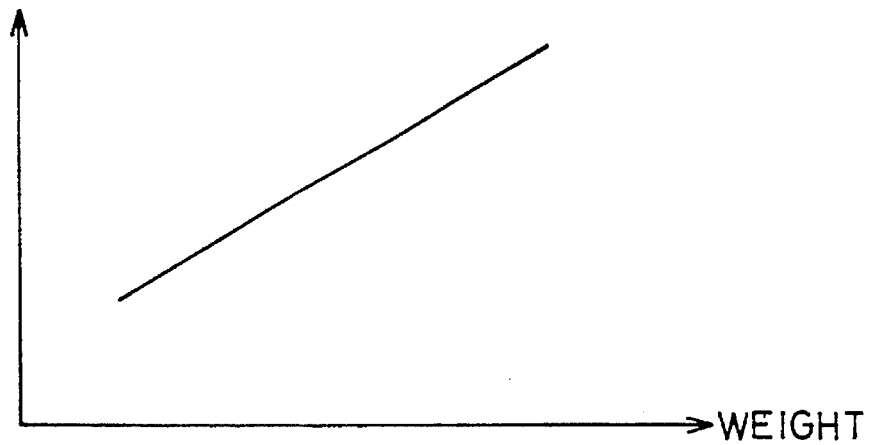
FIG. 7 is a graph illustrating a relation between a variation in capacitance of the weight sensor and the weight of a food in accordance with the present invention.

When the space d between the plate spring 25 and the copper foil 22 is varied by the downward movement of the plate spring 25 caused by the protrusion 31 of the weight sensor 5 pressed by the support roller 4, the capacitance C is varied, as shown in FIG. 6. Such a variation in capacitance C is carried out in a linear manner, depending on the weight W of a food to be heated, as shown in FIG. 7.

As the capacitance C of the weight sensor 5 varies, the sensor signal processing unit 12 generates an oscillation frequency F having a cycle variable depending on the variation in capacitance C. The frequency F from the signal processing unit 12 is applied to the control unit 14 which, in turn, discriminates the food weight W, based on the received frequency F.

The frequency F outputted from the sensor signal processing unit 12 through the inverters IN1 to IN3 and the resistor R shown in FIG. 8 can be expressed by the following equation:

$$F = 1/(T1+T2)$$
$$= 1/R \cdot C[\ln\{(2Vss-Vt)/(Vss-Vt)\} + \ln\{Vss+Vt)/Vt\}]$$

wherein, T1 represents a low level interval of a pulse signal and corresponds to $R \cdot C \cdot \ln\{(2Vss-Vt)/(Vss-Vt)\}$, T2 represents a high level interval of the pulse signal and corresponds to $R \cdot C \cdot \ln\{(Vss+Vt)/Vt\}$, Vss represents an operation voltage applied, Vt represents a threshold voltage of the inverters IN1 to IN3, and C represents the capacitance of the weight sensor 5.

As mentioned above, the frequency F generated by the sensor signal processing unit 12 is inversely proportional to the capacitance C of the weight sensor 5. Therefore, when the food weight W is larger, the space d becomes larger, thereby resulting in an increase in capacitance C. As a result, the frequency F from the sensor signal processing unit 12 becomes lower.

Figure 9:
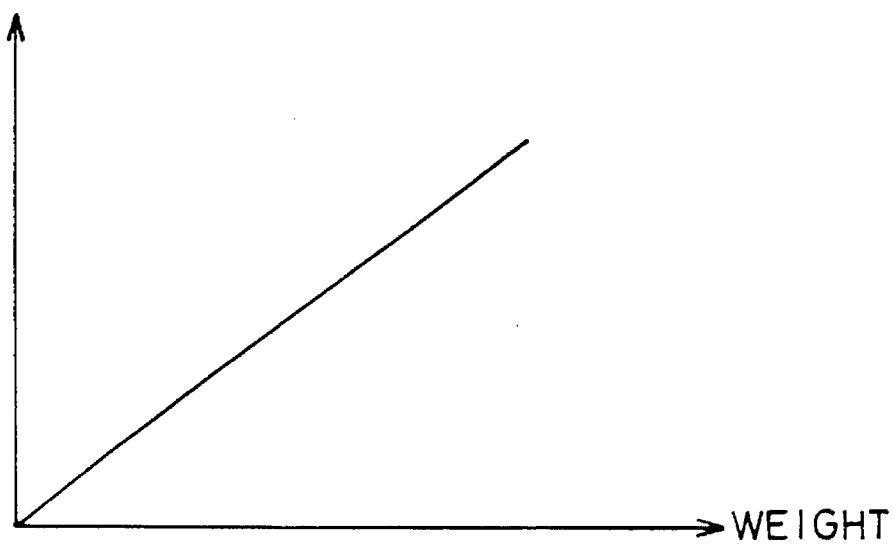
FIG. 9 is a graph illustrating a relation between a variation in frequency and the weight of a food in accordance with the present invention.
Figure 10:
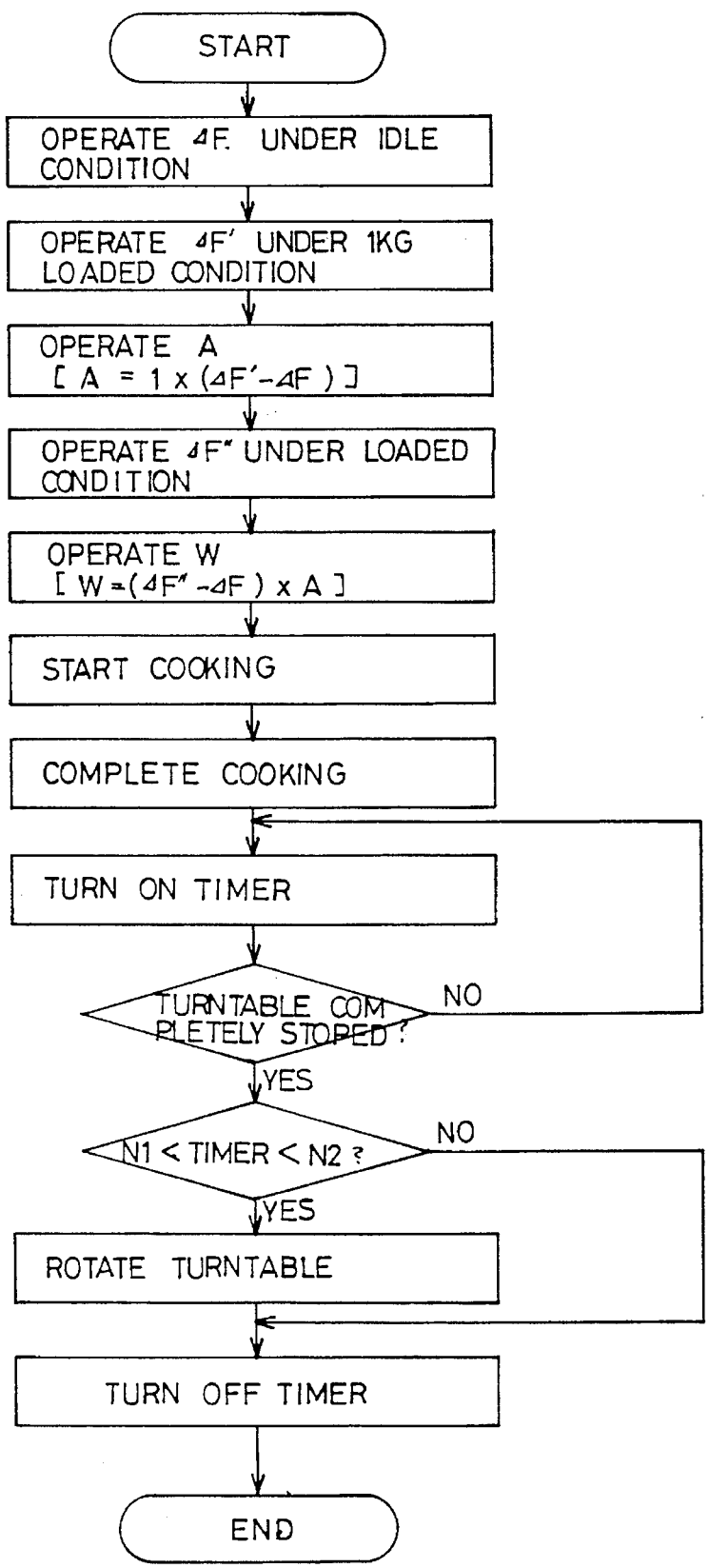
FIG. 10 is a flowchart illustrating a method of detecting a weight of a food in a microwave oven in accordance with the present invention.

In other words, where the food weight W is smaller, a variation in the space d becomes smaller, thereby resulting in a decrease in the capacitance variation. As a result, a variation in the frequency F becomes smaller. Thus the variation in frequency is proportional to the food weight W, as shown in FIG. 9.

As the frequency F outputted from the sensor signal processing unit 12 based on the food weight W is applied to the control unit 14, the variation in the frequency F is calculated in terms of weight so as to detect the food weight W.

The control unit 14 has been stored with a slope A operated from an average variation ΔF of frequencies f1 to fn outputted from the weight sensor 5 under an idle condition and an average variation ΔF' of frequencies f1 to fn outputted from the weight sensor 5 under a loaded condition that a food of 1 Kg to be heated is loaded.

Figure 11:
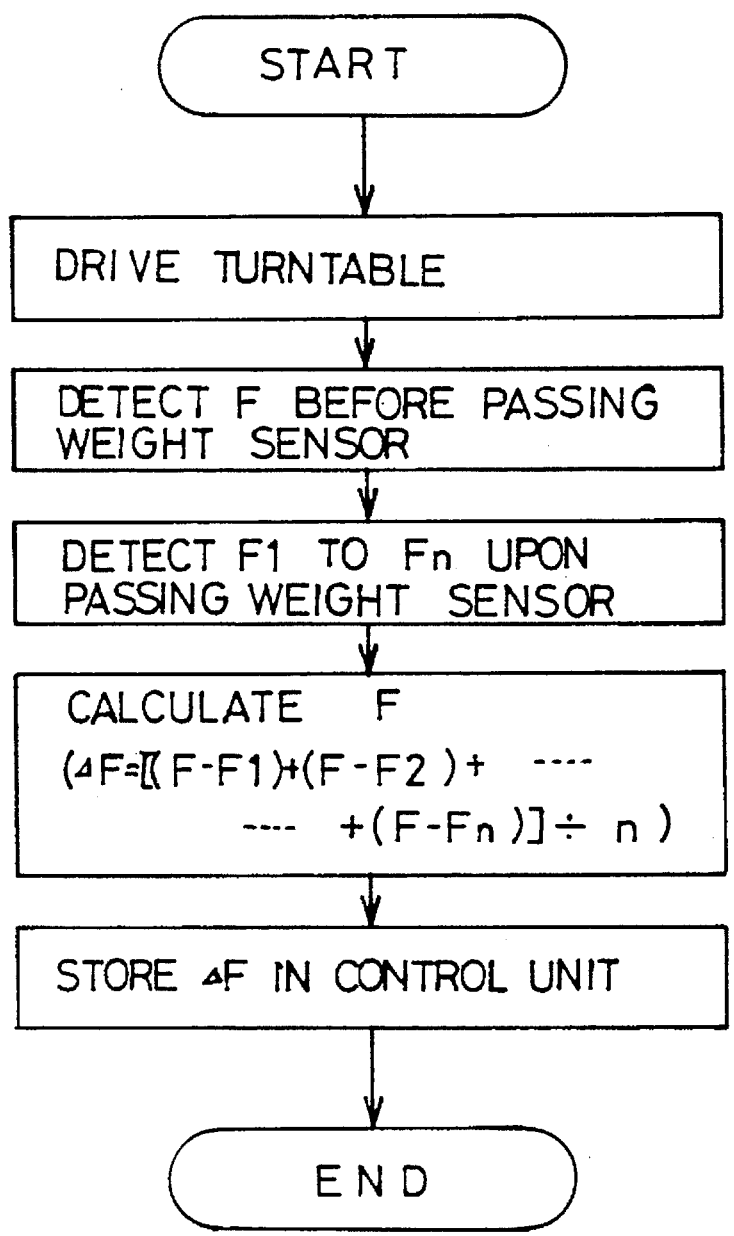
FIG. 11 is a flowchart illustrating a first procedure of the method of FIG. 10.

The average frequency variation ΔF under the idle condition can be derived through an operation procedure shown in FIG. 11.

First, a frequency is detected which is outputted from the sensor signal processing unit 12 before each support roller 4 passes the weight sensor 5 during the turntable 2 rotates under an idle condition that no food is placed on the turntable 2. Assumes the detected frequency as a reference frequency.

Thereafter, a minimum frequency is detected from frequencies outputted from the sensor signal processing unit 12 when each support roller 4 passes the weight sensor 5. The minimum frequency is then stored in a register. These operations are repeated for n number of support rollers 4 to store minimum frequencies f1 to fn.

In other words, the minimum frequency f1 is detected from the frequencies generated when the first support roller 4 passes the weight sensor 5. Thereafter, the minimum frequency f2 is detected from the frequencies generated when the second support roller 4 passes the weight sensor 5. This detection is repeated for n number of support rollers 4 until the minimum frequency fn is detected from the frequencies generated when the final support roller 4 passes the weight sensor 5.

Each of the minimum frequencies f1 to fn is deducted from the reference frequency F to derive a frequency variation. Frequency variations for all minimum frequencies f1 to fn are summed and the resultant sum is stored in a register SUM. Thereafter, the frequency variation sum stored in the register SUM is divided by the number of support rollers 4, namely, n, thereby deriving the average frequency variation ΔF under the idle condition. Accordingly, the average frequency variation ΔF can be expressed by the following equation:

$$\Delta F = [(F-f1)+(F-f2)+ \ldots +(F-fn)]/n$$

Now, a procedure will be described for operating a standard slope A from the average frequency variation ΔF outputted from the sensor signal processing unit 12 under the idle condition and an average frequency variation ΔF' outputted from the sensor signal processing unit 12 under a loaded condition that a food of 1 Kg to be heated is loaded.

Figure 12:
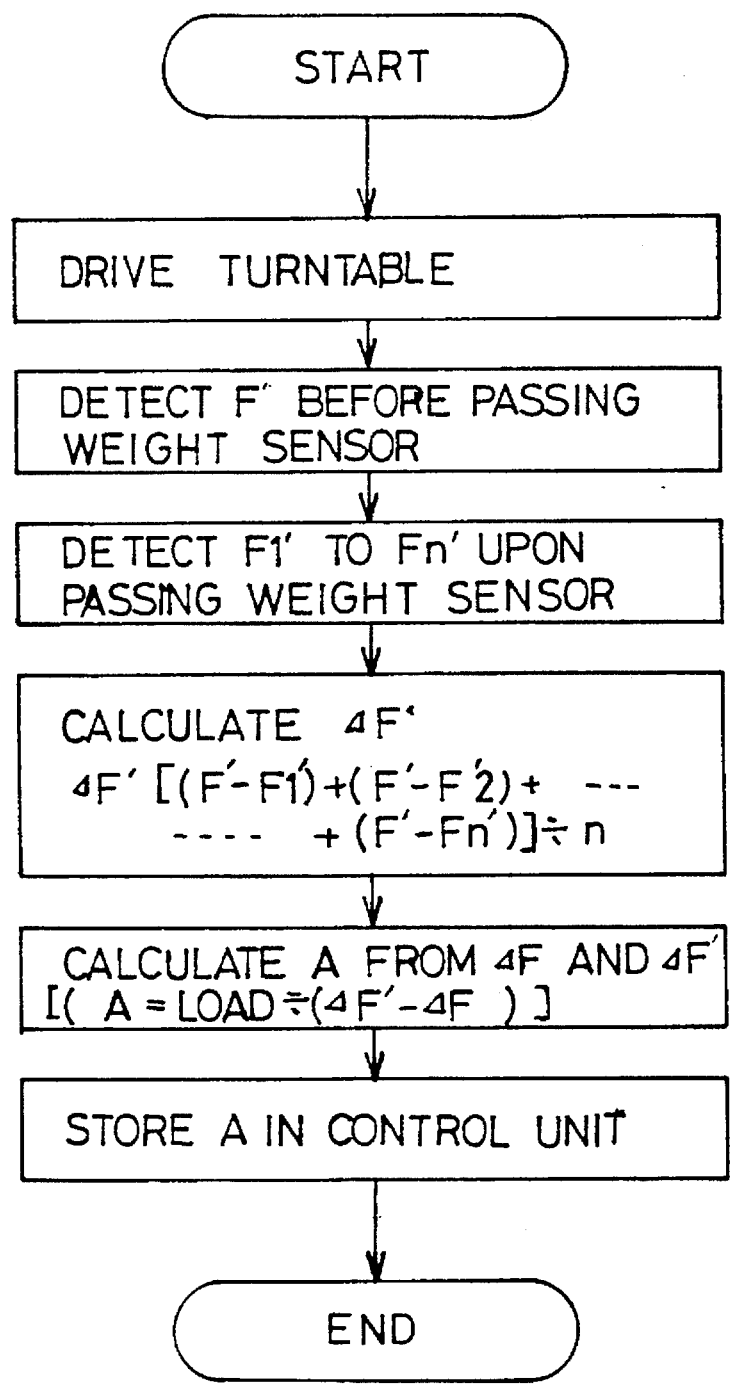
FIG. 12 is a flowchart illustrating second and third procedures of the method of FIG. 10.

First, a frequency F' is detected which is outputted from the sensor signal processing unit 12 before each support roller 4 passes the weight sensor 5 during the turntable 2 rotates under a loaded condition that a food of 1 Kg is placed on the turntable 2, as shown in FIG. 12. Assumes the detected frequency F' as a reference frequency.

Thereafter, minimum frequencies f'1 to f'n are detected from frequencies outputted from the sensor signal processing unit 12 when support rollers 4 pass the weight sensor 5 sequentially.

Each of the minimum frequencies f'1 to f'n is deducted from the reference frequency F' to derive a frequency variation. Frequency variations for all minimum frequencies f'1 to f'n are summed and the resultant sum is stored in a register SUM. Thereafter, the frequency variation sum stored in the register SUM is divided by the number of support rollers 4, namely, n, thereby deriving the average frequency variation ΔF' under the idle condition. Accordingly, the average frequency variation ΔF' can be expressed by the following equation:

$$\Delta F' = [(F'-f'1)+(F'-f'2)+ \ldots +(F'-f'n)]/n$$

As mentioned above, the standard slope A is derived from the average frequency variation ΔF' under the 1 Kg-loaded condition and the previously derived average frequency variation ΔF under the idle condition. The standard slope A satisfies the following equation:

$$A = \text{Load}(1 \text{ Kg})/(\Delta F' - \Delta F)$$

The standard slope A and the average frequency variation ΔF' under the 1 Kg-loaded condition are stored in the control unit 14 to be subsequently used.

Figure 13:
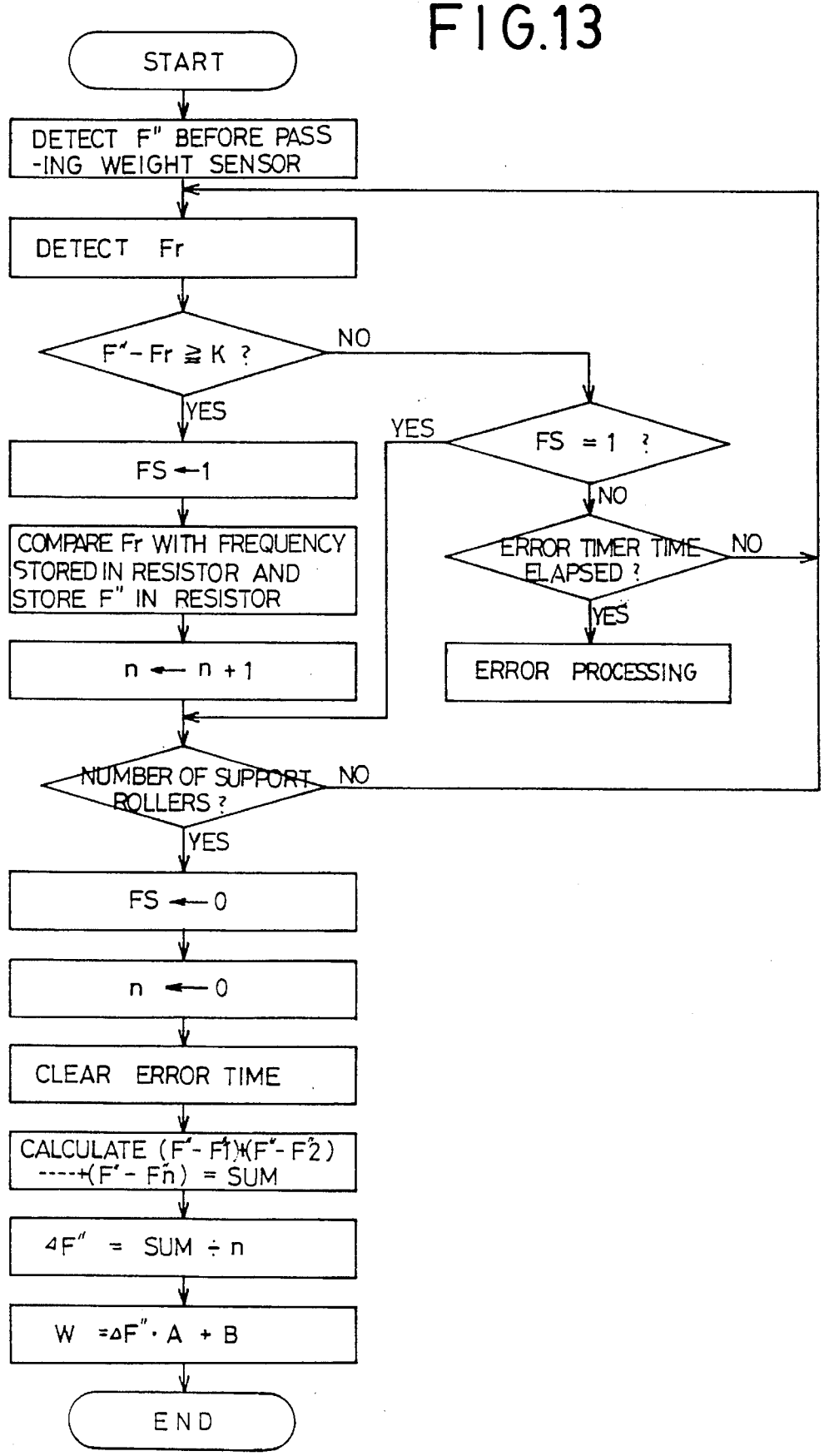
FIG. 13 is a flowchart illustrating fourth and fifth procedures of the method of FIG. 10.

A procedure for deriving the food weight W will now be described, in conjunction with FIG. 13.

As the turntable 2 rotates under a condition that a food has been put in the heating chamber 1, the support rollers 4 turn along their turning track. A frequency F" is detected which is outputted from the sensor signal processing unit 12 before each support roller 4 passes the weight sensor 5. Then, a frequency fr is detected which is outputted from the sensor signal processing unit 12 when each support roller passes the weight sensor 5. The detected frequency fr is then compared with the frequency F" so as to check whether the difference between the frequencies F" and fr is more than a predetermined value K.

When the difference between the frequencies F" and fr is less than the predetermined value K, it is determined that no support roller 4 has pressed the weight sensor 5 yet. A determination is then made about whether a frequency flag FS is set by a high level (=1). Where the frequency flag FS has not been set by the high level, an error timer is turned on and a determination is then made whether a predetermined time of, for example, about, 10 seconds which is sufficiently longer than the interval of the weight sensor 5 periodically pressed by the support rollers 4 has elapsed. When the difference between the frequencies F" and fr is still less than the predetermined value K even after the predetermined time has elapsed, an error processing is carried out.

On the other hand, when the difference between the frequencies F" and fr is not less than the predetermined value K, it is determined that one of support rollers 4 has pressed the weight sensor 5. In this case, the frequency flag FS is set by the high level. Then, a minimum one f" 1 of frequencies outputted from the sensor signal processing unit 12 is stored in the register. These operations are repeated for the number of support rollers 4.

After completion of the above procedure, the frequency flag FS is set by a low level and the error timer is cleared. Subsequently, the difference between each of the minimum frequencies f"1 to f"n stored in the register and the reference frequency F" are calculated. The calculated differences for the minimum frequencies f"1 to f"n are summed and the resultant sum is then stored in the register SUM. Thereafter, the frequency variation sum stored in the register SUM is divided by the number of support rollers 4, namely, n, thereby deriving the average frequency variation $\Delta F"$. Accordingly, the average frequency variation $\Delta F"$ can be expressed by the following equation:

$$\Delta F"=[(F"-f"1)+(F"-f"2)+\ldots+(F"-f"n)]/n$$

The derived average frequency variation $\Delta F"$ is then deducted from the average frequency variation $\Delta F$ under the idle condition previously stored in the control unit 14. The resultant value is multiplied by the standard slope A and then added with a constant B, thereby deriving the food weight W.

The food weight W derived through the above procedure satisfies the following equation:

$$W=(\Delta F"-\Delta F)*A+B$$

The food is cooked in accordance with a heating time, a temperature and a humidity set based on the derived food weight W.

Thereafter, the timer is turn on to count the elapsed time from the point of time N1 when one support roller 4 passes the weight sensor 5, thereby early predicting the point of time N2 just before next support roller 4 passes the weight sensor 5.

After completion of the cooking, the turntable 2 is completely stopped under a control of the drive unit 11. Simultaneously, the timer is turned off. At this time, the timer is checked so as to detect whether one of the support rollers 4 has been stopped at a position over the weight sensor 5.

Where the timer is turned off within the interval between the points of times N1 and N2, it is determined that one of the support rollers 4 has been stopped at a position beyond the weight sensor 5. On the other hand, when the timer is turned off beyond the interval between the points of times N1 and N2, it is determined that one of the support rollers 4 has been stopped at a position over the weight sensor 5. In the latter case, the turntable further rotates until the support roller 4 is stopped at a position beyond the weight sensor 5.

As apparent from the above description, the present invention provides an apparatus for and a method of detecting a food weight in a microwave oven wherein a weight sensor is used which has a capacitance variable depending on a food weight, thereby capable of accurately detecting the food weight by utilizing a variation in capacitance of the weight sensor and thus minimizing occurrence of errors irrespective of ambient temperature and humidity. In accordance with the present invention, support rollers are associated with the weight sensor and controlled not to be stopped at a position over the weight sensor so as to protect the weight sensor against the load of the food.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of detecting a food weight in a microwave oven, comprising the steps of:
    (a) operating an average value of variations of minimum frequencies each selected from frequencies generated in accordance with a variation in capacitance of a weight sensor under an idle condition that no food is put in a heating chamber;
    (b) operating an average value of variations of minimum frequencies each selected from frequencies generated in accordance with a variation in capacitance of said weight sensor under an 1 Kg-loaded condition of said heating chamber;
    (c) operating a slope from said average values respectively operated at said steps (a) and (b);
    (d) operating an average value of variations of minimum frequencies each selected from frequencies generated in accordance with a variation in capacitance of said weight, sensor under a food-loaded condition that a food to be heated is put in the heating chamber; and
    (e) detecting a weight of said food from the average value operated at the step (a), the slope operated at the step (c) and the average value operated at the step (d).

2. A method in accordance with claim 1, further comprising the steps of:
    (f) turning on a timer to count an elapsed time from a point of time when one of support rollers associated with said weight sensor to sequentially press the weight sensor passes the weight sensor after starting a cooking for said food in accordance with said food weight, a temperature and a humidity detected at said step (e), and setting a point of time just before a next support roller passes the weight sensor, based on the result of the counting;
    (g) turning off said timer at a point of time when a rotation of a turntable causing a turning of said support rollers is completely stopped, and checking said stopping point of time to check whether the timer has been turned off within a predetermined time interval; and
    (h) determining that an optional one of the support rollers has been stopped at a position over the weight sensor when the timer has been turned off beyond said predetermined time interval, and controlling said turntable to further rotate.

3. A method in accordance with claim 1, wherein said step (a) comprises the steps of:
    outputting, as a reference frequency, a frequency outputted from a sensor signal processing unit before one of support rollers associated with said weight sensor to sequentially press the weight sensor passes the weight sensor during a rotation of a turntable causing a turning of said support rollers under the idle condition;
    outputting a minimum one of frequencies generated every time when each of the support rollers passes the weight sensor during the rotation of said turntable;

deducting each of said minimum frequencies from said reference frequency to derive a frequency variation and summing all of derived frequency variations; and dividing the resultant sum by the number of the support rollers and outputting the resultant value as an average frequency variation under the idle condition.

4. A method in accordance with claim 1, wherein the operation of said average frequency variation under the 1 Kg-loaded condition at said step (b) is carried out in the same manner as said step (a).

5. A method in accordance with claim 1, wherein the operation of said average frequency variation under the food-loaded condition at said step (d) is carried out in the same manner as said step (a).

6. A method in accordance with claim 5, wherein said step (d) comprises the step of operating a difference between a frequency generated when each of said support rollers passes the weight sensor and said reference frequency generated before said support roller passes the weight sensor, and performing an error processing when said difference is less than a predetermined value.

* * * * *